US011853382B2

(12) United States Patent
Wang (10) Patent No.: US 11,853,382 B2
(45) Date of Patent: Dec. 26, 2023

(54) METHOD OF GENERATING A WEBPAGE AND A CONFERENCE ROOM FOR EACH SPECIFIC TOPIC

(71) Applicant: Charles Lap San Chan, Taipei (TW)

(72) Inventor: Tzu Te Wang, Taipei (TW)

(73) Assignee: CHAN, CHARLES LAP SAN, Taipei (TW)

( * ) Notice: Subject to any disclaimer, the term of this patent is extended or adjusted under 35 U.S.C. 154(b) by 44 days.

(21) Appl. No.: 17/943,568

(22) Filed: Sep. 13, 2022

(65) Prior Publication Data

US 2023/0084220 A1    Mar. 16, 2023

(30) Foreign Application Priority Data

Sep. 15, 2021    (TW) ................. 110134387

(51) Int. Cl.
*G06F 16/957*    (2019.01)
*G06Q 50/00*    (2012.01)
*G06F 16/958*    (2019.01)

(52) U.S. Cl.
CPC ........ *G06F 16/9574* (2019.01); *G06F 16/958* (2019.01); *G06Q 50/01* (2013.01)

(58) Field of Classification Search
None
See application file for complete search history.

(56) References Cited

U.S. PATENT DOCUMENTS

| 2013/0263020 A1* | 10/2013 | Heiferman | H04L 12/1818 715/753 |
| 2018/0285473 A1* | 10/2018 | Laptev | G06F 7/026 |
| 2019/0273627 A1* | 9/2019 | Whalin | H04W 4/021 |

OTHER PUBLICATIONS

Chenu-Abente et al., "An entity-based platform for the integration of social and scientific services", Oct. 1, 2012, IEEE, 8th International Conference on Collaborative Computing: Networking, Applications and Worksharing (CollaborateCom) (pp. 165-174) (Year: 2012).*

* cited by examiner

*Primary Examiner* — Davoud A Zand
(74) *Attorney, Agent, or Firm* — MUNCY, GEISSLER, OLDS & LOWE, P.C.

(57) ABSTRACT

The present invention provides a method of generating a webpage and a conference room, particularly to a method of generating a webpage and a conference room for each specific topic. In the method, the web contents of a plurality of target websites are searched to generate a topic webpage provided to a user for obtaining many contents associated with the topic in browsing the topic webpage. The method can also provide the connecting means of a public topic conference room or a personal topic conference room on the topic webpage. It is convenient for users who browse the topic webpage to communicate with each other in the public topic conference room or the personal topic conference room.

12 Claims, 6 Drawing Sheets

METHOD OF GENERATING A WEBPAGE AND A CONFERENCE ROOM FOR EACH SPECIFIC TOPIC

This application claims priority of Application No. 110134387 filed in Taiwan on 15 Sep. 2021 under 35 U.S.C. § 119; the entire contents of all of which are hereby incorporated by reference.

BACKGROUND OF THE INVENTION

Field of the Invention

The present invention relates to a method of generating a webpage and a conference room, particularly to a method of generating a webpage and a conference room for each specific topic.

Description of the Related Art

In today's society where Internet bandwidth has been increasing year by year and personal networking devices are becoming more and more common, having access to the Internet anytime and anywhere and searching fresh, interesting or popular web content to read has become a normal way of life. However, because different websites and forums on the Internet publish different contents, users often need to switch connections to different websites and forums in order to fully read the web contents on the topics that they are interested in.

In addition, in the current society where the Internet is developed, many people work from home because of changes in work patterns, which reduces social opportunities with other people. Alternatively, in order to cooperate with the government's epidemic prevention and isolation measures, many people cannot easily meet face-to-face with relatives and friends as usual.

In view of the foregoing description, it is inconvenient for users to frequently switch between different websites and forums when they are looking for articles that they are interested in, and the opportunities for social communication with others are reduced due to working from home or epidemic prevention and isolation measures. Therefore, how to help users quickly obtain relevant web contents that they are interested in and how to provide a channel for people to socially communicate with others have become the researching direction of those skilled in the art.

SUMMARY OF THE INVENTION

The primary objective of the present invention provides a method of generating a webpage and a conference room for each specific topic, which searches the web contents of a plurality of target websites to generate a topic webpage provided to a user for browsing the topic webpage to obtain many contents associated with the topic.

Another objective of the present invention provides a method of generating a webpage and a conference room for each specific topic, which provides a topic webpage and the connecting means of a public topic conference room or a personal topic conference room on the topic webpage. It is convenient for users who browse the topic webpage to communicate with each other in the public topic conference room or the personal topic conference room.

In order to achieve the foregoing objectives, the present invention provides a method of generating a webpage and a conference room for each specific topic, which includes:

Step (A): searching web contents from the Internet;
Step (B): filtering out a topic from the web contents;
Step (C): researching web contents associated with the topic from the Internet;
Step (D): storing web contents associated with the topic to serve as topic data; and
Step (E): generating a topic webpage according to the topic data.

The features, advantages, or similar expressions mentioned in the specification do not mean that all the features and advantages that can be realized by the present invention should be in any single specific embodiment of the present invention. Rather, it should be understood that the expression of related features and advantages means that the specific features, advantages, or characteristics described in conjunction with specific embodiments are included in at least one specific embodiment of the present invention. Therefore, the discussion of features and advantages, and similar expressions in the specification is related to the same specific embodiment, but it is not necessary.

Below, the embodiments are described in detail in cooperation with the drawings to make easily understood the technical contents, characteristics and accomplishments of the present invention.

DETAILED DESCRIPTION OF THE INVENTION

In order to make the description of the present disclosure more detailed and complete, the following provides an illustrative description for the implementation aspects and specific embodiments of the present invention; but this is not the only way to implement or use specific embodiments of the present invention. The implementation manners cover the characteristics of a number of specific embodiments and the steps and sequences of the method used to construct and operate these specific embodiments. However, other specific embodiments can also be used to achieve the same or equal functions and sequence of steps.

The present invention provides a method of generating a webpage and a conference room for each specific topic, which searches the web contents of a plurality of target websites to generate a topic webpage provided to a user for browsing the topic webpage to obtain many contents associated with the topic. The method of the present invention provides a topic webpage and the connecting means of a public topic conference room or a personal topic conference room on the topic webpage. It is convenient for users who browse the topic webpage to communicate with each other in the public topic conference room or the personal topic conference room.

Figure 1:
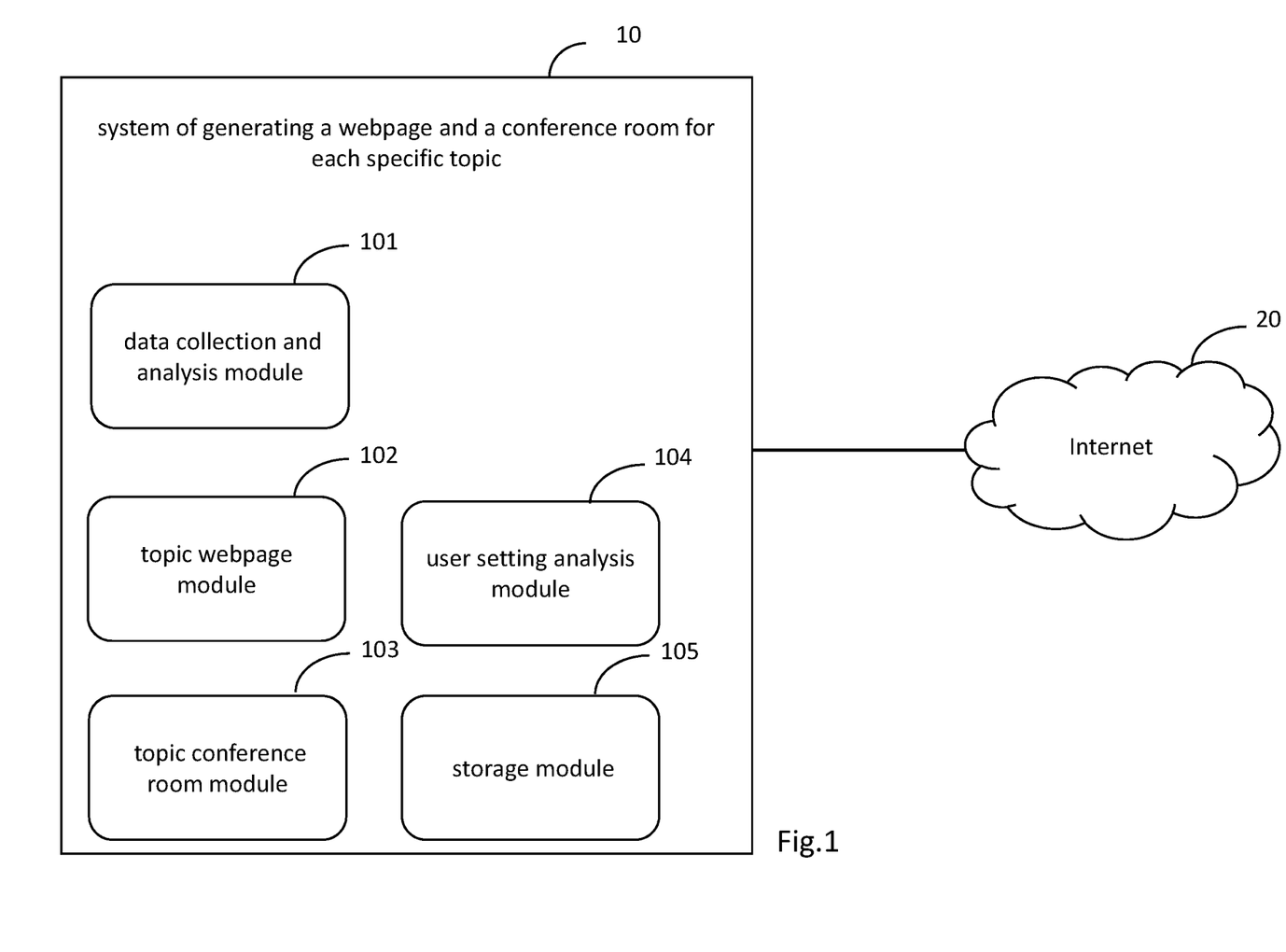
FIG. 1 is a schematic diagram illustrating a system of generating a webpage and a conference room for each specific topic according to a preferred embodiment of the present invention.

Refer to FIG. 1. FIG. 1 is a schematic diagram illustrating a system of generating a webpage and a conference room for each specific topic according to a preferred embodiment of the present invention. The purpose of each function module in the system will be described, and the operation process of the system will be further described later. In FIG. 1, a system 10 of generating a webpage and a conference room for each specific topic includes a data collection and analysis module 101, a topic webpage module 102, a topic conference room module 103, a user setting analysis module 104, and a storage module 105. The system 10 of generating a webpage and a conference room for each specific topic is connected to the Internet 20.

The data collection and analysis module 101 can search web contents from the Internet, filter out a topic from the web contents, research the web contents associated with the topic from the Internet, set up a plurality of target websites, search the web contents of the plurality of target websites from the Internet, and research the web contents associated with the topic from the Internet according to an updating condition.

The topic webpage module 102 can generate a topic webpage according to topic data, update the topic webpage according to the updating condition, and adjust the locations or sizes of a plurality of content areas of the topic webpage according to the operation of a user. The topic webpage module 102 can also provide the connecting means of a public topic conference room and a personal topic conference room and the reserving data of a personal topic conference room on the topic webpage.

The topic conference room module 103 can generate a public topic conference room, generate a personal topic conference room according to the operation of the user, and reserve the time for a personal topic conference room according to the operation of the user.

The user setting analysis module 104 can transmit a notification message to the user according to user preference data filled in by a user in registering an account, so as to notify the user of browsing topic webpages associated with the user preference data. The user setting analysis module 104 can also analyze the action of a user in browsing the topic webpage to generate the user interest data. According to the user interest data, the user setting analysis module 104 transmits a notification message to the user to notify the user of browsing topic webpages associated with the user interest data. The user setting analysis module 104 can also set a frequency value and transmit the notification message to the user according to the frequency value to avoid unduly disturbing the user. The user setting analysis module 104 can also transmit a notification message to the user in updating the topic webpage, and record the locations or sizes of multiple content areas of the topic webpage adjusted by the user.

The storage module 105 is configured to store web contents, which are associated with the topic and searched by the data collection and analysis module 101 from the Internet, to serve as topic data.

Figure 2:
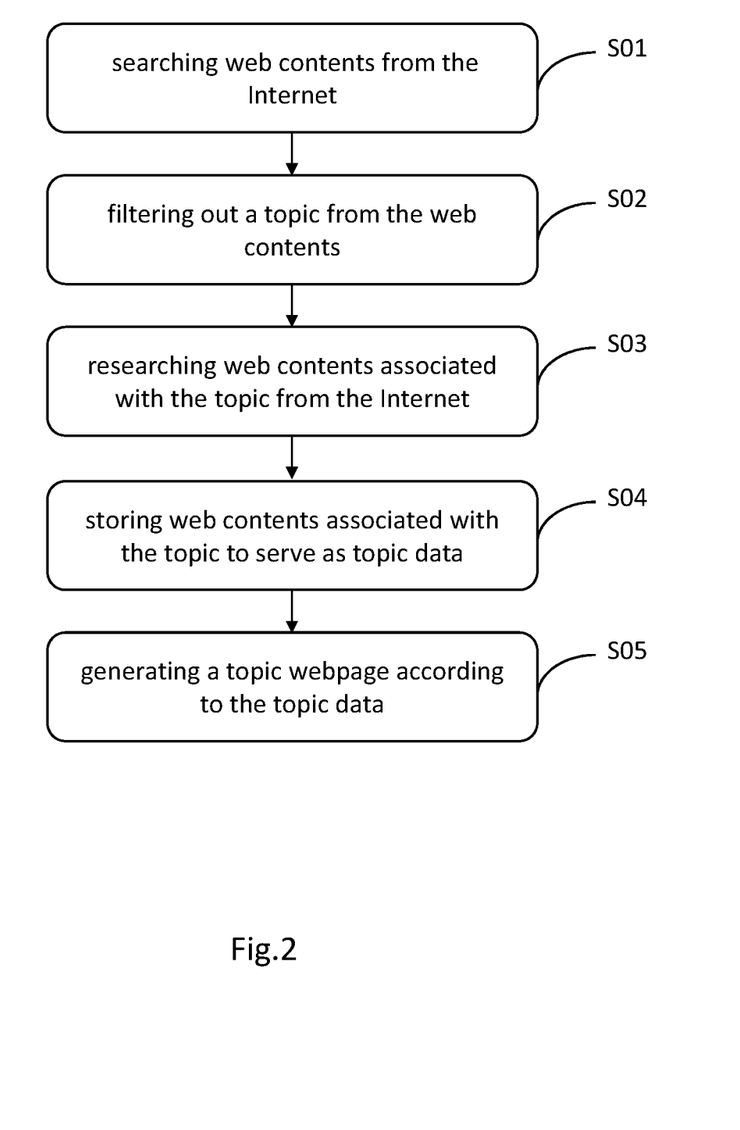
FIG. 2 is a flowchart of a method of generating a webpage and a conference room for each specific topic according to a first preferred embodiment of the present invention.

FIG. 2 is a flowchart of a method of generating a webpage and a conference room for each specific topic according to a first preferred embodiment of the present invention. In the following description, please refer to FIG. 1 and FIG. 2. It should be understood that the function of each module will be specifically described in the following flowchart. According to different requirements, the order of the steps in the flowchart can be changed, and some steps can be omitted.

In Step S01, web contents are searched from the Internet. For example, the manager of the system 10 of generating a webpage and a conference room for each specific topic can operate the data collection and analysis module 101 to set up a plurality of target websites. The target websites can include blog websites, Weibo websites, forum websites, news websites, picture websites, video websites, etc., such as Google, Baidu, TikTok, YouTube, Instagram, CNN, etc. The data collection and analysis module 101 searches the web contents of the plurality of websites from the Internet 20.

In Step S02, a topic is filtered out according to the web contents. In an embodiment of the present invention, the data collection and analysis module 101 filters out a topic according to the web contents. For example, some web contents provide information such as Top Keywords, Top News, Top Search Terms, Top Charts, Top Pictures, Top Videos, etc. In an embodiment, the data collection and analysis module 101 can retrieve the keyword and the search term as the topics. In another embodiment, the data collection and analysis module 101 can also retrieve the titles of the top news, the top picture, and the top video and filter out a topic according to the number of repetitions of a wording in these titles. However, the present invention is not limited to these methods for filtering out a topic.

In Step S03, the web contents associated with the topic are researched according to the topic. At this time, the data collection and analysis module 101 researches the web contents associated with the topic according to the topic. For example, the topic filtered out in Step S02 may be "Release in New Apple Mobile Phone", "Launch of New Vaccine", "Opening of the Olympic Games", etc. The data collection and analysis module 101 specifically searches web contents associated with "Release in New Apple Mobile Phone", "Launch of New Vaccine", and "Opening of the Olympic Games". The data collection and analysis module 101 can employ computer learning to determine whether the web content is associated with the topic. For example, regarding the topic of "Release in New Apple Mobile Phone", you can provide the web contents related to "Release in New Apple Mobile Phone" as positive examples in advance, and provide the web contents unrelated to "Release in New Apple Mobile Phone" as negative examples. The web contents are input into the classification algorithm of machine learning, such as a support vector machine, a neural network, etc., so that the data collection and analysis module 101 can determine the web contents related to "Release in New Apple Mobile Phone".

In Step S04, the web contents associated with the topic are stored to serve as topic data. After the data collection and analysis module 101 searches the web contents associated with the topic, the storage unit 105 stores the web contents associated with the topic to serve as topic data. For example, the storage unit 105 stores the web contents associated with "Release in New Apple Mobile Phone" to serve as topic data. Alternatively, the storage unit 105 stores the web contents associated with "Launch of New Vaccine" to serve as topic data.

In Step S05, a topic webpage is generated according to the topic data. In the present invention, the topic webpage module 102 generates a topic webpage (not shown) according to the topic data stored in the storage unit 105. The topic webpage has a plurality of content areas, which include title areas, picture areas, news-link areas, forum-link areas, text discussion areas, public topic conference room areas, personal topic conference room areas, or a combination of these, but the present invention is not limited thereto. The title area is used to show the topic of the topic webpage, such as "Release in New Apple Mobile Phone". The picture area can, for example, show the thumbnails of multiple pictures. The user can click on each picture in order to automatically link to the uniform resource locator (URL) of the picture. That is to say, the user connects to the original address of the picture on the Internet to view the picture. The news-link area can show, for example, the titles of the news from different websites. The user can click on each news title in order to automatically link to the URL of the news. That is to say, the user connects to the original address of the news on the Internet to read the news.

The forum-link area can show, for example, the titles of discussion areas from different forums. The user can click on the title of each discussion area in order to automatically link to the URL of the discussion area. That is to say, the user connects to the original address of the discussion area on the Internet to read the discussion area. The text discussion area can be, for example, a text chatting room. The user can chat and interact with other users in the text chatting room when viewing the topic webpage. The public topic conference room area can show the connecting means of one or more public topic conference rooms, such as a button or a text with a hyperlink. When the user clicks on the button or the hyperlink, they can connect to the public topic conference room, so as to facilitate social communication with others.

The personal topic conference room area can show the connecting means of one or more personal topic conference rooms, such as a button or a text with a hyperlink. When a user clicks on the button or the hyperlink, the user can connect to a personal topic conference room created by another user (e.g., another user is a well-known expert or an influencer) to facilitate social communication with another user in his personal topic conference room. In addition, The personal topic conference room area can also show the information of the personal topic conference room that the user will create a personal topic conference room in the future (for example, an influencer makes an appointment to create a personal topic conference room 3 hours later), so that other users who are interested in the user can know this information and enter the personal topic conference room to participate in the discussion at the appropriate time.

Figure 3:
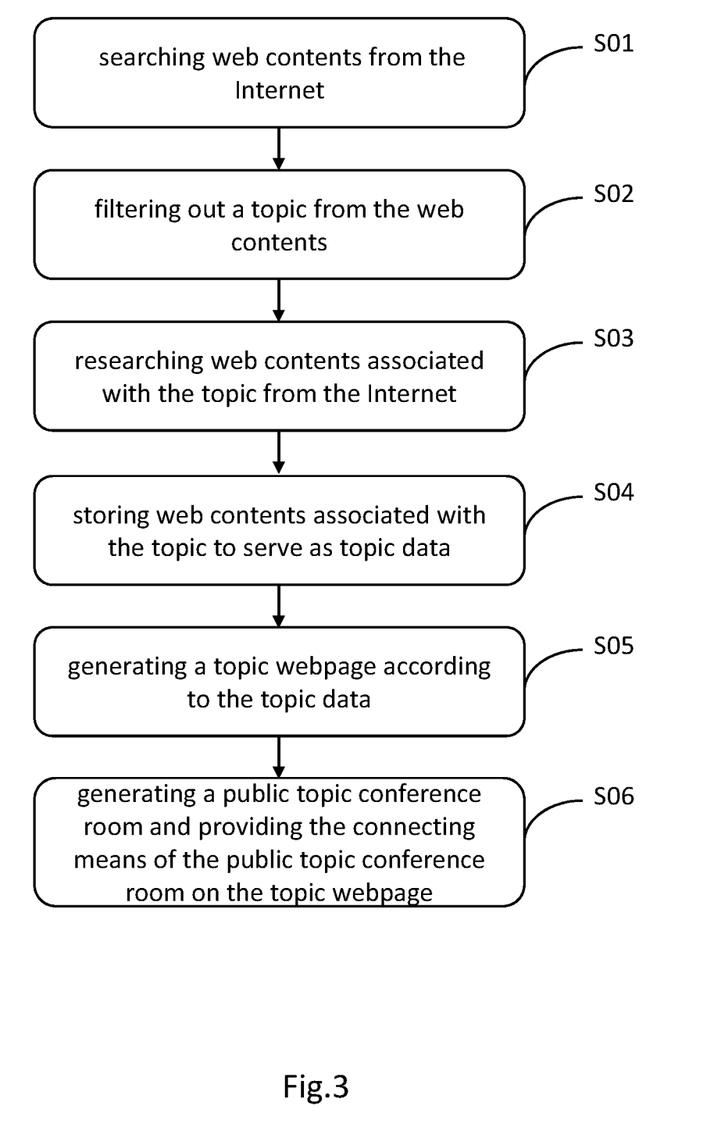
FIG. 3 is a flowchart of a method of generating a webpage and a conference room for each specific topic according to a second preferred embodiment of the present invention.

FIG. 3 is a flowchart of a method of generating a webpage and a conference room for each specific topic according to a second preferred embodiment of the present invention. Steps S01-S05 have been mentioned in the foregoing description so will not reiterated. In Step S06 of FIG. 3, a public topic conference room is generated and the connecting means of the public topic conference room is provided on the topic webpage. In the present invention, the topic conference room module 103 generates the public topic conference room, and the topic webpage module 102 shows the connecting means of the public topic conference room on the public topic conference room area, such as a button or a text with a hyperlink.

In another embodiment of Step S06 of FIG. 3, a personal topic conference room is generated and the connecting means of the personal topic conference room is provided on the topic webpage according to the operation of a user. For example, the personal topic conference room area shows a button for creating a personal topic conference room. The user clicks on the button to generate a user interface. The user interface is provided to the user for inputting the title of the personal topic conference room, the introduction of the personal topic conference room, the maximum number of users, the list of invited users, the opening and closing time of the personal topic conference room, etc., but the present invention is not limited thereto. Then, the topic conference room module 103 generates the personal topic conference room, and the topic webpage module 102 shows the connecting means of the personal topic conference room on the personal topic conference room area, such as a button or a text with a hyperlink. The connecting means is convenient for other users to enter a personal topic conference room created by a user (e.g., the user is a well-known expert or an influencer) to participate in the discussion.

In further embodiment of Step S06 of FIG. 3, time for a personal topic conference room is reserved and the data of the personal topic conference room are provided on the topic webpage according to the operation of a user. For example, the user can operate the user interface, such that the topic conference room module 103 makes an appointment to create a personal topic conference room at certain time in the future. Then, the topic webpage module 102 shows the data of the personal topic conference room created by the user in the future on the personal topic conference room area, so that other users who are interested in the user can know the data and enter the personal topic conference room of the user to participate in the discussion at the appropriate time.

Figure 4:
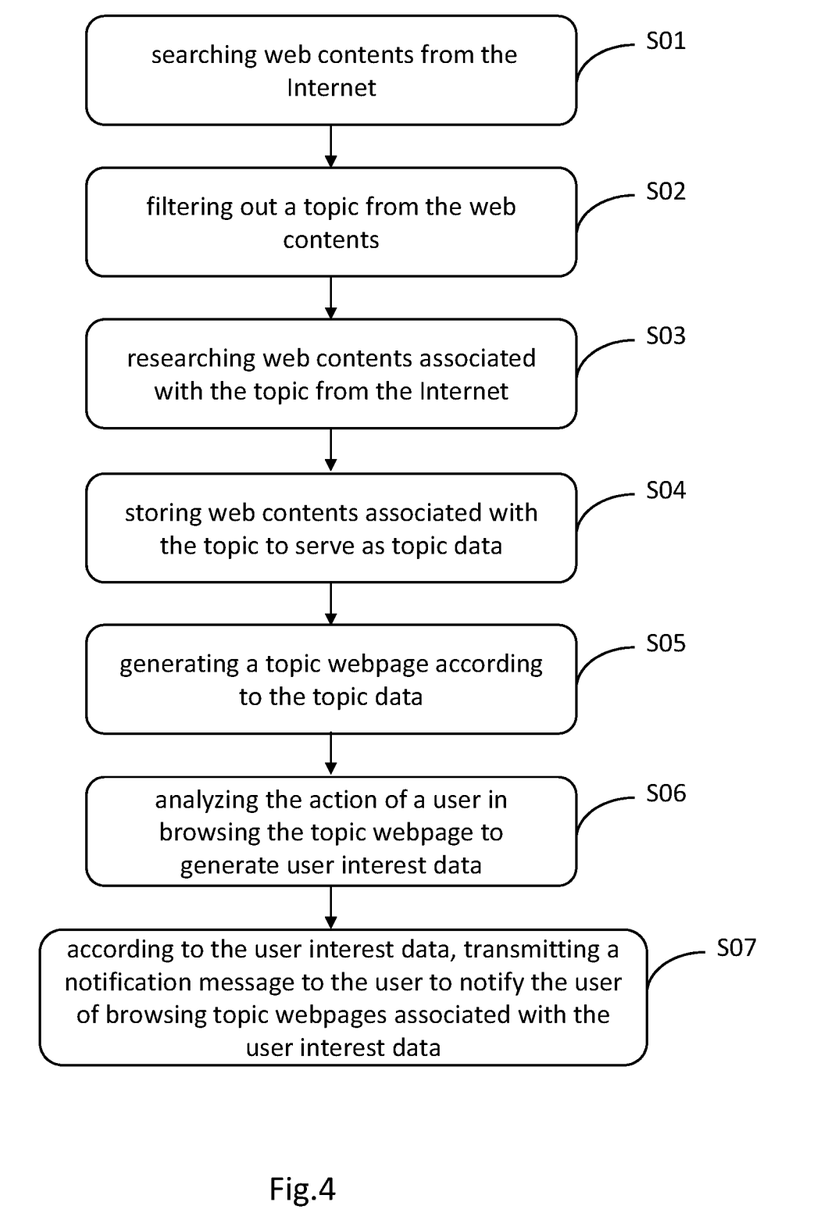
FIG. 4 is a flowchart of a method of generating a webpage and a conference room for each specific topic according to a third preferred embodiment of the present invention.

FIG. 4 is a flowchart of a method of generating a webpage and a conference room for each specific topic according to a third preferred embodiment of the present invention. Steps S01-S05 have been mentioned in the foregoing description so will not reiterated. In Step S06 of FIG. 4, the action of a user in browsing the topic webpage is analyzed to generate user interest data. The user setting analysis module 104 can analyze the action of a user in browsing the topic webpage to generate user interest data. For example, if the user's mouse cursor stays in the picture area and the news-link area for a long time, or clicks on the picture area and the news-link area more times, it can be recorded in the user's user interest data that the user is more interested in the pictures and news of this topic. Alternatively, the user browses the topic webpages of 3C for a long time among the topic webpage of various topics, such that it can be recorded in the user interest data of the user that the user is more interested in this topic. It should be understood that the present invention is not limited to the foregoing method for analyzing the user's interest. In addition, in order to protect the privacy of users, the users can also choose not to want to analyze the personal interest information when filling in the personal information during a registration process. Alternatively, the users modify the settings of the personal accounts not to want to analyze the personal interest information at any time.

In Step S07 of FIG. 4, a notification message is transmitted to the user to notify the user of browsing topic webpages associated with the user interest data according to the user interest data. As mentioned above, it is recorded in the user's user interest data that the user is more interested in the pictures and news of a specific topic. As a result, when the picture area and the news-link area of this topic webpage are updated in the future, the user setting analysis module 104 will transmit a notification message to the user to notify the user of browsing topic webpages associated with the user interest data according to the user interest data. Alternatively, it is recorded in the user's user interest data that the user is more interested in the topic of 3C. As a result, when the topic webpages of 3C are updated, the user setting analysis module 104 will transmit a notification message to the user to notify the user of browsing topic webpages of 3C according to the user interest data. The notification message can be used to notify users by means of a text message, an e-mail, or a dialog box on a web page, etc. In addition, in Step S07, the user setting analysis module 104 can further set a frequency value and transmit the notification message to the user according to the frequency value to avoid unduly disturbing the user. For example, the frequency value may be up to once a day, three times a week, etc.

In the present invention, each of Steps S06 and S07 of FIG. 4 has another embodiment. In the embodiment, Step S06 has access to user preference data filled in by a user in registering an account. For example, the user fills out a form when registering an account, wherein the form can provide multiple options for the user to select the topics he/her likes, such as: 3C, sports, investment, movies, travel, politics, etc. The topics that the user likes are recorded in the user preference data. As a result, the user setting analysis module 104 can has access to user preference data filled in by a user in registering an account. Then, in Step S07, the user setting analysis module 104 can transmit a notification message to the user to notify the user of browsing topic webpages associated with the user preference data according to the user preference data. For example, the system generates a new topic webpage associated with 3C. The user setting analysis module 104 can search users interested in 3C from the user preference data and transmit notification messages to the users.

Figure 5:
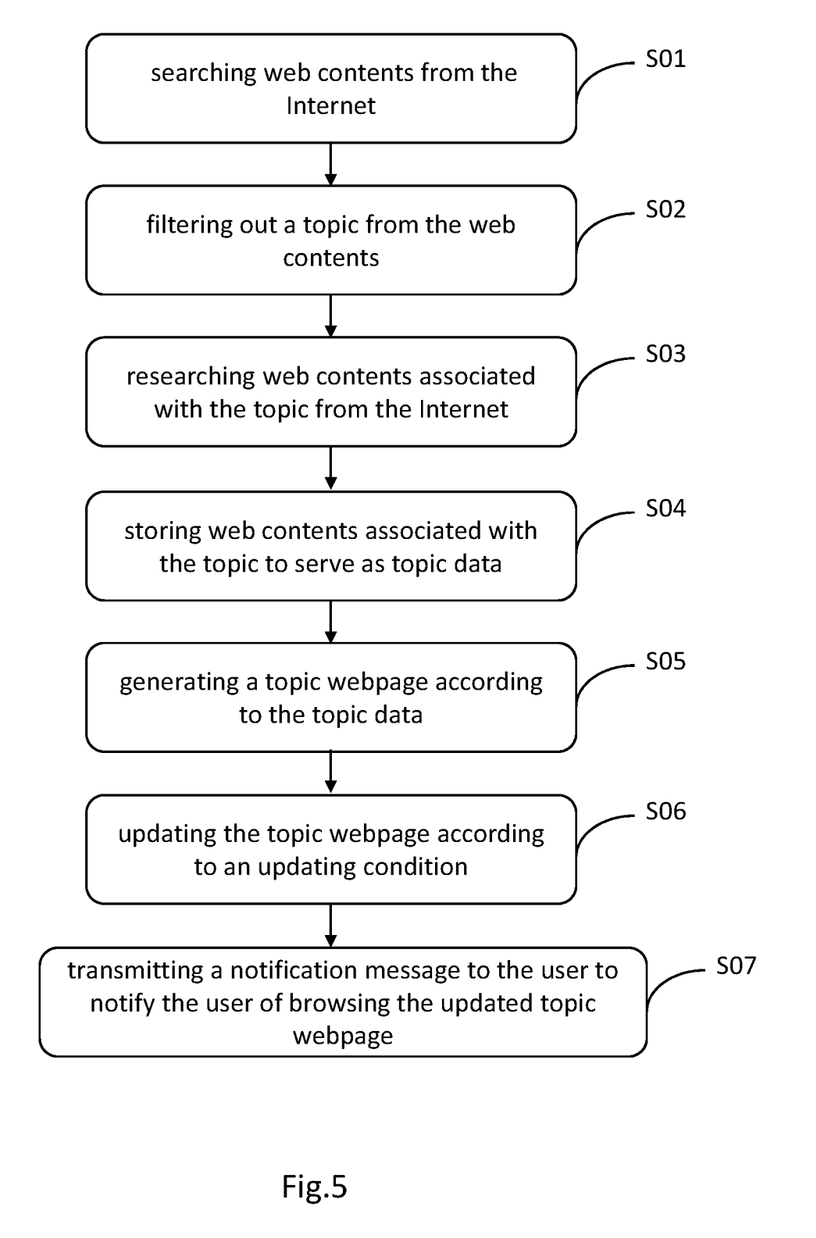
FIG. 5 is a flowchart of a method of generating a webpage and a conference room for each specific topic according to a fourth preferred embodiment of the present invention.

FIG. 5 is a flowchart of a method of generating a webpage and a conference room for each specific topic according to a fourth preferred embodiment of the present invention. Steps S01-S05 have been mentioned in the foregoing description so will not reiterated. In Step S06 of FIG. 5, the topic webpage is updated according to an updating condition. Step S06 includes the following steps. Firstly, the data collection and analysis module 101 sets the updating condition, wherein the updating condition includes the number of daily updates (e.g., once a day), the time of daily updates (e.g., updating daily at 6 pm so that users can browse new contents after hours), a triggering event (e.g., a system administrator manually requests an update), or a combination of these. Then, the data collection and analysis module 101 researches web contents associated with the topic from the Internet according to the updating condition. The storage unit 105 stores web contents associated with the topic to serve as topic data. Finally, the topic webpage module 102 updates the topic webpage according to the topic data stored in the storage unit 105.

In Step S07 of FIG. 5, a notification message is transmitted to the user to notify the user of browsing the updated topic webpage. For example, after updating the topic webpage, the user setting analysis module 104 can transmit a notification message to all the users to notify all the users of browsing the updated topic webpage. For another example, after updating the topic webpage, the user setting analysis module 104 can transmit a notification message to the user according to the user preference data or the user interest data to notify the user interested in the topic of browsing the updated topic webpage.

Figure 6:
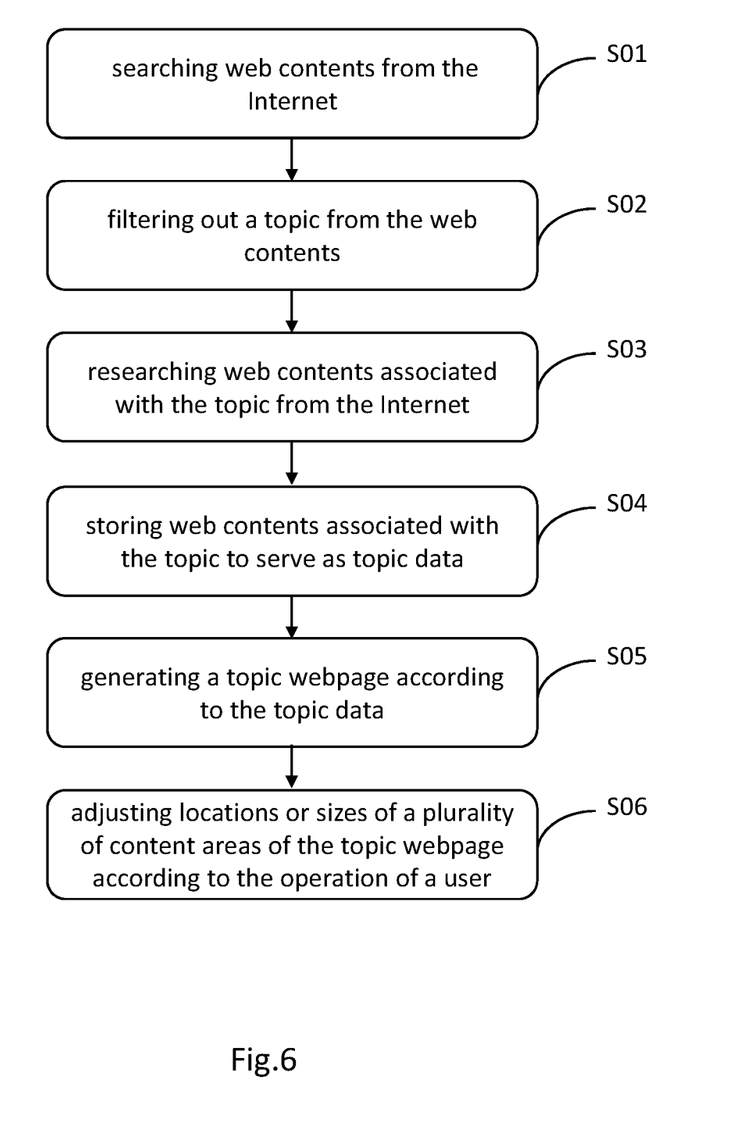
FIG. 6 is a flowchart of a method of generating a webpage and a conference room for each specific topic according to a fifth preferred embodiment of the present invention.

FIG. 6 is a flowchart of a method of generating a webpage and a conference room for each specific topic according to a fifth preferred embodiment of the present invention. Steps S01-S05 have been mentioned in the foregoing description so will not reiterated. In Step S06 of FIG. 6, the locations or sizes of a plurality of content areas of the topic webpage are adjusted according to the operation of a user. As mentioned in the foregoing description, the topic webpage has a plurality of content areas, which include title areas, picture areas, news-link areas, forum-link areas, text discussion areas, public topic conference room areas, personal topic conference room areas, or a combination of these. In order to provide users with the best experience and satisfy the customized requirement of each user, the users can adjust the locations or sizes of the content areas of the topic webpage by dragging or adjusting the borders on the topic webpage. The user setting analysis module 104 can record the locations or sizes of the content areas of the topic webpage adjusted by the user and store them in the user preference data. When the user enters the system again to browse the topic webpage in the future, the topic webpage module 102 will adjust the locations or sizes of the content areas of the topic webpage according to the user's user preference data, so as to provide the user with the form of topic webpage that the user likes.

According to the forgoing description, the present invention provides a method of generating a webpage and a conference room for each specific topic, which searches the web contents of a plurality of target websites to generate a topic webpage provided to a user for browsing the topic webpage to obtain many contents associated with the topic. The method of the present invention also can provide the connecting means of a public topic conference room or a personal topic conference room on the topic webpage. It is convenient for users who browse the topic webpage to communicate with each other in the public topic conference room or the personal topic conference room.

Although various examples of the disclosed technology have been described above, it should be understood that these examples have been presented by examples rather than limited. Likewise, various drawings may depict example architectures or other configurations of the disclosed technology. The drawings may be depicted to assist in understanding the features and functionality that may be included in the disclosed technology. The disclosed technology is not limited to the illustrated example architectures or configurations, but the desired features can be implemented using a variety of alternative architectures and configurations. In fact, it will be obvious to those skilled in the art to know how to implement alternative functionalities, logical or physical partitions and configurations to implement the required features of the technology disclosed in this article. In addition, with regard to flowcharts, operation descriptions, and methodological technical solutions, the order in which the steps are presented herein should not require that the disclosed technologies be implemented in the same order to perform the listed functionality, unless the context dictates otherwise.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method of generating a webpage and a conference room for each specific topic, performed by a system of generating a webpage and a conference room for each specific topic, comprising:
   Step (A): searching web contents from the Internet;
   Step (B): filtering out a topic from the web contents;
   Step (C): researching web contents associated with the topic from the Internet;
   Step (D): storing web contents associated with the topic to serve as topic data; and Step (E): generating a topic webpage according to the topic data.

2. The method of generating a webpage and a conference room for each specific topic according to claim 1, wherein Step (A) comprises:
   Step (A1): setting up a plurality of target websites; and
   Step (A2): searching web contents of the plurality of target websites from the Internet.

3. The method of generating a webpage and a conference room for each specific topic according to claim 1, further comprising:
   Step (F): generating a public topic conference room and providing a connecting means of the public topic conference room on the topic webpage.

4. The method of generating a webpage and a conference room for each specific topic according to claim 1, further comprising:
   Step (F): generating a personal topic conference room and providing a connecting means of the personal topic conference room on the topic webpage according to operation of a user.

5. The method of generating a webpage and a conference room for each specific topic according to claim 1, further comprising:
   Step (F): reserving time for a personal topic conference room and providing data of the personal topic conference room on the topic webpage according to operation of a user.

6. The method of generating a webpage and a conference room for each specific topic according to claim 1, further comprising:
   Step (F): analyzing an action of a user in browsing the topic webpage to generate user interest data; and
   Step (G): according to the user interest data, transmitting a notification message to the user to notify the user of browsing topic webpages associated with the user interest data.

7. The method of generating a webpage and a conference room for each specific topic according to claim 6, wherein Step (G) comprises:
   Step (G1): setting a frequency value; and
   Step (G2): transmitting the notification message to the user according to the frequency value.

8. The method of generating a webpage and a conference room for each specific topic according to claim 1, further comprising:
   Step (F): having access to user preference data filled in by a user in registering an account; and
   Step (G): according to the user preference data, transmitting a notification message to the user to notify the user of browsing topic webpages associated with the user preference data.

9. The method of generating a webpage and a conference room for each specific topic according to claim 1, further comprising:
   Step (F): updating the topic webpage according to an updating condition; and
   Step (G) transmitting a notification message to the user to notify the user of browsing the updated topic webpage.

10. The method of generating a webpage and a conference room for each specific topic according to claim 9, wherein Step (F) comprises:
   Step (F1): setting the updating condition, wherein the updating condition comprises number of daily updates, time of daily updates, a triggering event, or a combination of these;
   Step (F2): according to the updating condition, researching web contents associated with the topic from the Internet;
   Step (F3): storing web contents associated with the topic to serve as topic data; and
   Step (F4): updating the topic webpage according to the topic data.

11. The method of generating a webpage and a conference room for each specific topic according to claim 1, wherein the topic webpage has a plurality of content areas, which comprise title areas, picture areas, news-link areas, forum-link areas, text discussion areas, public topic conference room areas, personal topic conference room areas, or a combination of these.

12. The method of generating a webpage and a conference room for each specific topic according to claim 11, further comprising:
   Step (F): adjusting locations or sizes of a plurality of content areas of the topic webpage according to operation of a user.

* * * * *